United States Patent
Weaver

(10) Patent No.: US 6,587,621 B2
(45) Date of Patent: Jul. 1, 2003

(54) RECONFIGURABLE OPTICAL CABLE SPLICE

(75) Inventor: Thomas L. Weaver, Webster Groves, MO (US)

(73) Assignee: The Boeing Company, Seattle, WA (US)

(*) Notice: Subject to any disclaimer, the term of this patent is extended or adjusted under 35 U.S.C. 154(b) by 22 days.

(21) Appl. No.: 10/010,107

(22) Filed: Nov. 30, 2001

(65) Prior Publication Data

US 2003/0103728 A1 Jun. 5, 2003

(51) Int. Cl.[7] .................................................. G02B 6/26
(52) U.S. Cl. ............................. 385/39; 385/50; 385/97; 385/114; 385/135
(58) Field of Search ............................. 385/39, 42, 47, 385/50–52, 114, 135, 97, 99

(56) References Cited

U.S. PATENT DOCUMENTS 5,708,753 A * 1/1998 Frigo et al. .................. 385/147
6,494,625 B1 * 12/2002 Brandt et al. .................. 385/95

* cited by examiner

*Primary Examiner*—John Juba
*Assistant Examiner*—Fayez Assaf
(74) *Attorney, Agent, or Firm*—DiPinto & Shimokaji, P.C.

(57) ABSTRACT

A system, including reconfigurable optical cable splice for splicing optical cables, that does not require any direct handling of the optical fiber is described. The optical splice includes at least one input line; a plurality of output lines; and a plurality of connecting elements of substantially cubic shape including at least one ninety degree turning cube and a plurality of straight through cubes. Each of the connecting elements has a first surface disposed to be coupled to an end of the at least one input line and having at least two surfaces disposed to be coupled to at least two output lines respectively, whereby each input line defines an optic path for optic signals using one of the plurality of output lines. The splice further includes at least one storage location for storing at least one connecting element not in use. For reconfiguration, the system requires no electricity, no special tools, and no cleaning of fiber connections.

16 Claims, 2 Drawing Sheets

RECONFIGURABLE OPTICAL CABLE SPLICE

GOVERNMENT RIGHTS

The invention described herein was prepared in the performance of work under DARPA Agreement No. MDA972-97-3-0008. The Government has certain rights in this invention.

BACKGROUND OF THE INVENTION

This invention relates to optical cable splices for various optical communication applications and, more specifically, to a reconfigurable optical cable splice which allows connections to an optical cable or module to be reconfigured so as to use spare fibers in the event of damage to optical fibers originally in use.

Known methods for repair of optical links in vehicles, such as aircraft, at the time of damage include removal and replacement of the damaged cable, repair of the damaged cable, and linking in a spare fiber to skirt the damage followed by repair or replacement of the damaged cable at a convenient time. The first method is difficult to perform on vehicles where the cables often run in inaccessible locations. It also requires having on hand a replacement cable, a situation that is rarely the case in extreme conditions such as in battle.

As to repair of optical fiber cables, special tools and training is currently required, and it is difficult to do properly except in clean hanger conditions. It is also time consuming, even in the laboratory environment, wherein the repair process usually requires 30 minutes per optic link to be repaired. The use of ribbon cables can speed the repair time per fiber. However, even those methods can be difficult to apply in the field because of the need to directly handle the fragile glass fibers during the repair process. In addition, the use of spare fibers installed in vehicles such as an aircraft at the time of system installation can avoid any need to handle the fibers, if the method is applied correctly.

Another technique has been to have spare fibers running the entire distance run by the main fibers. In that approach, there has been no known way to protect the ends of the unused fibers. Accordingly, they are often damaged, and have to be cut back and cleaned before they can be terminated and used to replace a broken fiber. Additionally, the optic fibers have to be terminated at the time of use, which is a similar process to the 30-minute repair process mentioned above and requires special tools and training.

Yet another approach has been to have the spare fibers terminated and the termini contained in a safe environment until needed. However, for ribbon cables, it is awkward in application since the fibers are all grouped together in close proximity.

It has also been known to use automated reconfiguration approaches based on electromechanical switches. Such systems have several drawbacks, including extra weight, power consumption, large optical losses through the switches, and the need to positively lock the reconfiguration system in its proper state during flight.

As can be seen, there is a need for a manual optical cable reconfiguration or rearrangement of systems that avoids the above problems. The rearrangement of the connections should be done in as simple and robust a system as possible, with a minimum of special tools, cleaning, or training required. The reconfiguration should allow optical connections to be rearranged manually at an existing maintenance point. It should not require any direct handling of the optical fiber, nor should it require any electricity. It should make use of simple optical components and manufacturing techniques commonly known in industry. Another factor involved is cost savings.

SUMMARY OF THE INVENTION

In one aspect of the present invention, an optical cable splice includes at least one input line; a plurality of output lines; a plurality of connecting elements of substantially cubic shape, including at least one ninety degree turning cube and a plurality of straight through cubes, each of the connecting elements has a first surface disposed to be coupled to an end of at least one input line and at least two surfaces disposed to be respectively coupled to at least two output lines, whereby each input line defines an optic path for optic signals using one of the plurality of output lines; and at least one storage location for storing at least one connecting element not in use.

In another aspect of the present invention, an optic cable system has a first device; a second device; and a coupling subsystem coupling the first device and the second device, with the subsystem including a reconfigurable splice having a first end disposed to accommodate a first number of optic fibers coupled to the first device and a second end disposed to accommodate a second number of optic fibers coupled to the second device, wherein the first number has a lesser value than the second number, which has a plurality of input lines equal in number with the first number of optic fibers; a plurality of output lines equal in number with the second number of optic fibers; a plurality of connecting elements of substantially cubic shape including at least one ninety degree turning cube and a plurality of straight through cubes, each of the connecting element has a first surface disposed to be coupled to an end of the plurality of input lines and having at least two surfaces disposed to be coupled to at least two output lines respectively, whereby each input line defines an optic path for optic signals using one of the plurality of output lines; and at least one storage location for storing at least one connecting element not in use.

In still another aspect of the present invention, there is disclosed an aircraft optic cable system which includes an initial segment easily accessed for maintenance. The initial segment includes a first device; and a reconfigurable optical splice coupled to the first device. The optical splice has a first end disposed to accommodate a first number of optic fibers coupled to the first device and a second end disposed to accommodate a second number of optic fibers coupled to the second device, wherein the first number has a lesser numerical value than the second number; a plurality of input lines equal in number with the first number of optic fibers; a plurality of output lines equal in number with the second number of optic fibers; a plurality of connecting elements of substantially cubic shape including at least one ninety degree turning cube and a plurality of straight through cubes, each of the connecting elements has a first surface disposed to be coupled to an end of the plurality of input lines and having at least two surfaces disposed to be coupled to at least two output lines respectively, whereby each input line defines an optic path for optic signals using one of the plurality of output lines; at least one storage location for storing at least one connecting element not in use; and an intermediate segment not easily accessed by the maintainer. The intermediate segment has ribbon cables having a first end coupled to the plurality of output lines and spaced apart from the plurality of input lines, and a first portion of a set of discrete cables coupled to a second end of the ribbon cables disposed to fan-out to various locations. The system includes a final segment easily accessed for maintenance. The final segment includes a second device, and a second portion of the set of discrete cables interposed between the second device and the ribbon cables.

In yet still another aspect of the present invention, there is disclosed a method for configuring an optical cable splice which includes the steps of determining whether configuring is needed; opening a cover of the optical cable splice; and rearranging elements within the optical cable splice, whereby an incoming signal coming from an incoming cable is redirected from a first output cable to a second output cable.

As can be appreciated, this invention addresses a need for using fiber optics because of its high bandwidth and high density of signals achievable in connectors. The high density will be used to bring optical signals out of enclosures through small connectors for ribbon cables. However, in most cases, it is not desirable to take all the fibers in the ribbon from one location to another. It is necessary to "fan-out" the fibers so that the cable can branch and reach different locations. Therefore, in a vehicle such as an aircraft, a number of ribbon cables may be installed deep inside the aircraft, whereas at both ends of the cable system, one can use ribbon cables that may be easily changed or single fibers that can be easily exchanged. By way of an example, the cables may be used in the avionics bays leading to a number of locations in the peripherals of an airplane.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1A:
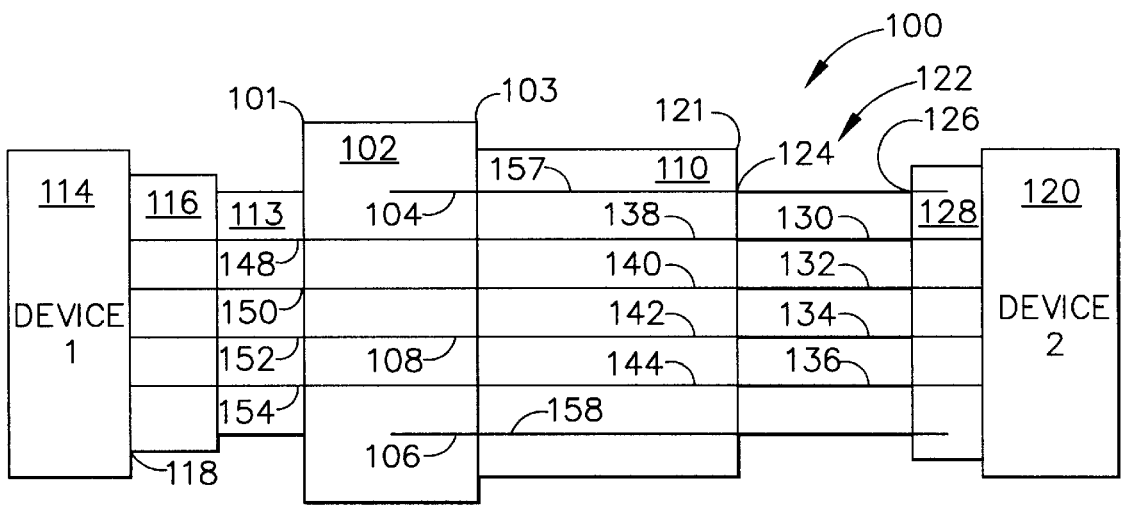
FIG. 1A is a schematic of typical optical cables, including the inventive reconfigurable optical cable splice shown with normal optical connections.
Figure 1B:
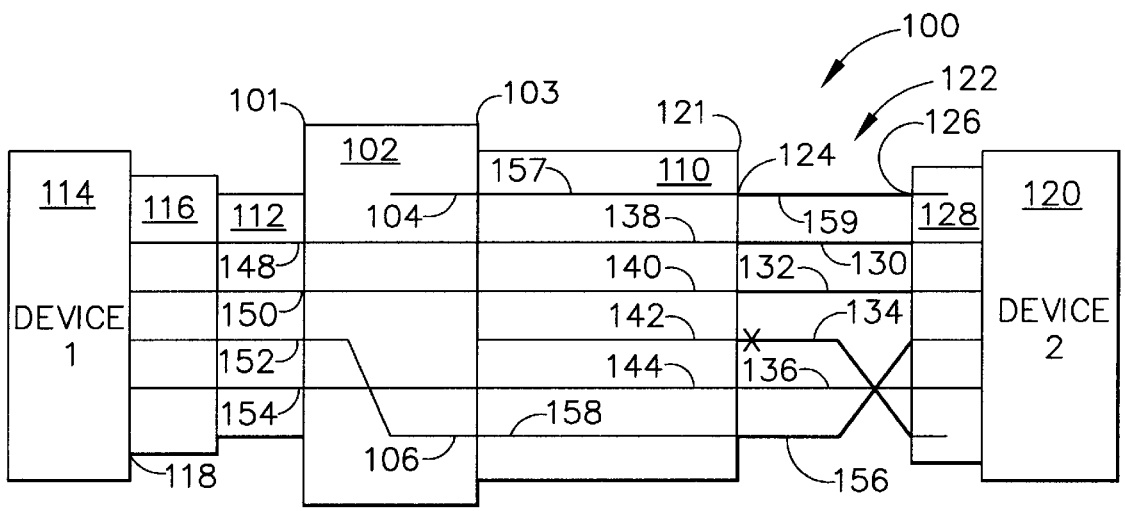
FIG. 1B is a schematic of typical optical cables, including the inventive reconfigurable optical cable splice shown with reconfigured optical connections.

Referring to FIGS. 1A and 1B, an optical cable system 100 includes a reconfigurable optical cable splice 102 having an input end 101 and an output end 103. Reconfigurable optical cable splice 102 may render various connections (shown below) in optical cable system 100 to be reconfigured such that spare fibers 104, 106 may be used in the event of damage to optical fibers within optical cable system 100, such as fiber 108 that is originally in use. By way of example, optical cable system 100 may be applied in an aircraft optical cable harness or module.

A ribbon cable 110 having a set of optical fibers may be coupled to output end 103 of reconfigurable optical cable splice 102. In FIGS. 1A and 1B, these cables may have six optical fibers in each. But the number of optical fibers may vary in different circumstances. These ribbon cables 110 are repairable and may be replaced if damaged. However, repair and replacement are generally a depot level activity because of the difficulty involved. Furthermore, repair and replacement of ribbon cable 110 is rarely required because the ribbon cables 110 are generally in protected locations deep in the optical cable system 100 such as a data link from one side to the other of an aircraft fuselage.

Short ribbon cables 112 may be coupled to input end 101 of reconfigurable optical cable splice 102. For example, short ribbon cables 112 may reside in avionic devices (not shown) that connect between the enclosure of the avionic devices and the ribbon cables 110. The short ribbon cables 112 may be attached to the ribbon cables 110 by means of a mechanical splice, or reconfigurable optical cable splice 102, which is the reconfiguration point of optical cable system 100.

A first device 114 having a first device connector 116 may be connected to a first end 118 of the short ribbon cables 112. The first device 114 may be a device that includes a central processing unit (CPU).

Reconfigurable splice 102 may serve several functions. First, reconfigurable splice 102 may permit the short ribbon cables 112 to be replaced without touching the ribbon cables 110, which may be hard to reach by a repairman. Furthermore, since ribbon cables 110 are generally located in places not easily accessible, they are much less likely to be damaged during use and maintenance than the short ribbon cables 112. Therefore, it is desirable to separate cables into two portions, i.e., short ribbon cables 112 and ribbon cables 110 by means of reconfigurable splice 102.

Second, since the short ribbon cables 112 are intended to be replaced, if damaged, they are not made to be repaired. Therefore, the optical fibers in short ribbon cables 112 may be very closely spaced as in the compact fiber spacing common in the telephone or telecommunications industry. Since the ribbon cables 110 cannot easily be removed because of their location inaccessibility, they are designed with the intent of being repaired by means of mechanical ribbon cable repair splice 102 of the instant invention. Therefore, it is desirable to have the ribbon cables 110 fibers spread out onto a wider spacing than is common for telecommunication cables because it makes it possible for the splice to include funnel-like structures that guide the fibers into the alignment grooves inside the splice. That reduces the level of skill needed to splice multi-fiber ribbon cables. The reconfigurable splice 102 accomplishes the transition between the narrow fiber spacing of the short ribbon cables 112 and the wide fiber spacing of the ribbon cables 110.

Third, the thermal environments are different around ribbon cables 110 and short ribbon cables 112, with the result that the ribbon cables 110 require a different buffer (not shown) on the glass fibers from the short ribbon cables 112. This results in different fiber diameters between ribbon cables 110 and short ribbon cables 112. Reconfigurable splice 102 may accomplish the transition between the different diameter fibers by means of its inherent structure, which will be shown below.

Fourth, and perhaps most critical to this invention, the ribbon cables 110 may have spare fibers 157 and 158 forming part of ribbon cable 110, and respectively connected to spare fibers 104 and 106 of configurable splice 102. It should be noted that short ribbon cables 112 do not have spare fibers. Cables 112 do not have spare fibers because they are ribbon cables likely to be connected to high-density array optical connectors. The possibility of connector 116 being an array connector must be allowed for, because in many situations there is very limited space on enclosures 114 for optical connectors, and array connectors make best use of the limited space. However, to provide spare fibers in array connectors means the fibers in the connector and the cable connected to it must be permanently connected. That means that to use the spare fibers would require reconfiguration inside enclosure 114, which would be difficult to implement and inconvenient to use. There are at least two reasons why the ribbon cables 110 may have spare fibers 104 and 106. The first reason is that the ribbon cables 110 will be difficult to replace since they are inaccessible and, thus, spare fibers 157 and 158 may serve as replacements. The second reason is that at the other end of the ribbon cables 110 where they may be coupled to devices such as second device 120 in the periphery of a vehicle such as wing tips of an airplane, cable damage is likely to occur. However, since peripheral devices are unlikely to require large numbers of optical fibers, they are unlikely to use array connectors. Therefore, at the peripheral device, the ribbon cable may fan out into a number of individual fiber cables. Providing suitable built-in spare fibers in this system is desirable and practical.

At output end 121 of each ribbon cable 110, the cables may also fan out into a set of single fiber cables 122 because the destination of each fiber may be at locations that the dimension of ribbon cable 110 output end 121 may not easily accommodate. An example is a situation where the connection point related to second device 120 may actually be multiple connection points spaced apart in such a way that output end 121 of the ribbon cable 110 may not easily accommodate. The set of single fiber cables 122 may have a collective first end 124 coupled to ribbon cables 110, and a collective second end 126 coupled to second device 120 via a second device connector 128, which makes the final connection to second device 120 that is also known as the end device. A second example of a reason for a fan out in the ribbon cable is the possibility that device 120 may have such limited access that it is necessary to place power connections and optic fibers in the same connector 128. Such an arrangement can be accommodated easily with connectors that have individual wire and fiber cables leading to them, but cannot be easily accomplished with connectors containing array fiber optic connectors for ribbon cable.

Having only one connector instead of two per optic and electric interfaces may be of major importance to aircraft design since it saves space on the front face of a device and also reduces weight. The source of the weight reduction lies in the fact that aerospace optical connections must be very robust, so most of the weight of a connector is in the outer connection system, called the "shell". As is a common feature of all packaging systems, one large shell weighs less than two little shells of the same capacity because the capacity of a connector is related to its area, but the weight of the shell is related to the circumference around the area. If small connector 1 has an area of 1, and connector 2 has an area of 2, so that two connector 1s are needed to have the same capability as one connector 2, the circumference around connector 2 will be the square root of 2 times larger than the circumference around connector 1. However, since two connector 1s are needed to be equal the capability of one connector 2 the circumferences around the two connector is will be the greater value, in a ratio of 2 to the square root of 2. Since the mass of the connector shell is related to the circumference, the two small shells will weigh more than the one large shell.

Using a connector with individual fiber cables brought to it allows spare fibers 104, 106, and their respective extension 157, 158, to be brought all the way to the final device by single cable 156 and 159 of the set 122. This is important because cable ends connecting to devices in the periphery of vehicles, such as aircraft, tend to suffer much higher damage rates than cable ends connected to devices at the center, such as the avionics bays. In other words, cable sections closer to second device connector 128 tend to be exposed to conditions that cause damage to cable more so than elsewhere. Since damage is more likely to occur in the periphery, it may be preferable to have spare fibers 104, 106, 156, 157, 158, and 159 already in place, rather than use the remove and replace approach that is commonly used for damaged short ribbon cables 112.

By way of example, reconfiguration of optical cable system 100, which is also known as an optical link, works as follows: Second device 120 may use fibers 130, 132, 134, and 136 for its interface with the rest of optical cable system 100. Fibers 130, 132, 134, and 136 normally connect to fibers 138, 140, 142, and 144 in ribbon cable 110, and via reconfigurable splice 102, to fibers 148, 150, 152, and 154 in short ribbon cable 112. In the event that fiber 134 is damaged (shown as an "X" in FIG. 1B), a maintenance or repair person may quickly reconfigure single fiber cables 122, for example, the end of a cable harness (not shown) by opening the back of connector 128 on second device 120, and interchanging the locations of the termini for cable 134 and the previously unused cable 156. This change may be accomplished with a simple manual terminus insertion/removal tool, and does not require any handling of bare fiber, nor does this change require any fiber cutting, cleaning, gluing, or polishing. However, making the change at the end of single fiber cable 122 harness or second device connector 128 may require a change at the other end or other portions of the optical cable system 100 in order to transmit the optical signal from fiber 152 into the former spare fiber 158. In other words, the intended signal from the first device 114 still needs to be transmitted to the intended terminus of the second device 120.

At short ribbon cables 112 end of fiber optic system 100, the maintenance or repair person may open the reconfigurable optical cable splice 102 by opening a cover (not shown) thereon, and rearranging it so that fiber 152 may no longer be connected to fiber 142, but instead may be connected to fiber 158. The optical cable splice 102 may be designed so that neither the ribbon cable 110 nor the short ribbon cables 112 may need to be removed from the optical cable splice 102 to accomplish the reconfiguration. Thus, bare fiber is never handled, and there is no need for any fiber cutting, cleaning, gluing, or polishing. The operation of the reconfigurable optical cable splice 102 is described below.

Figure 2A:
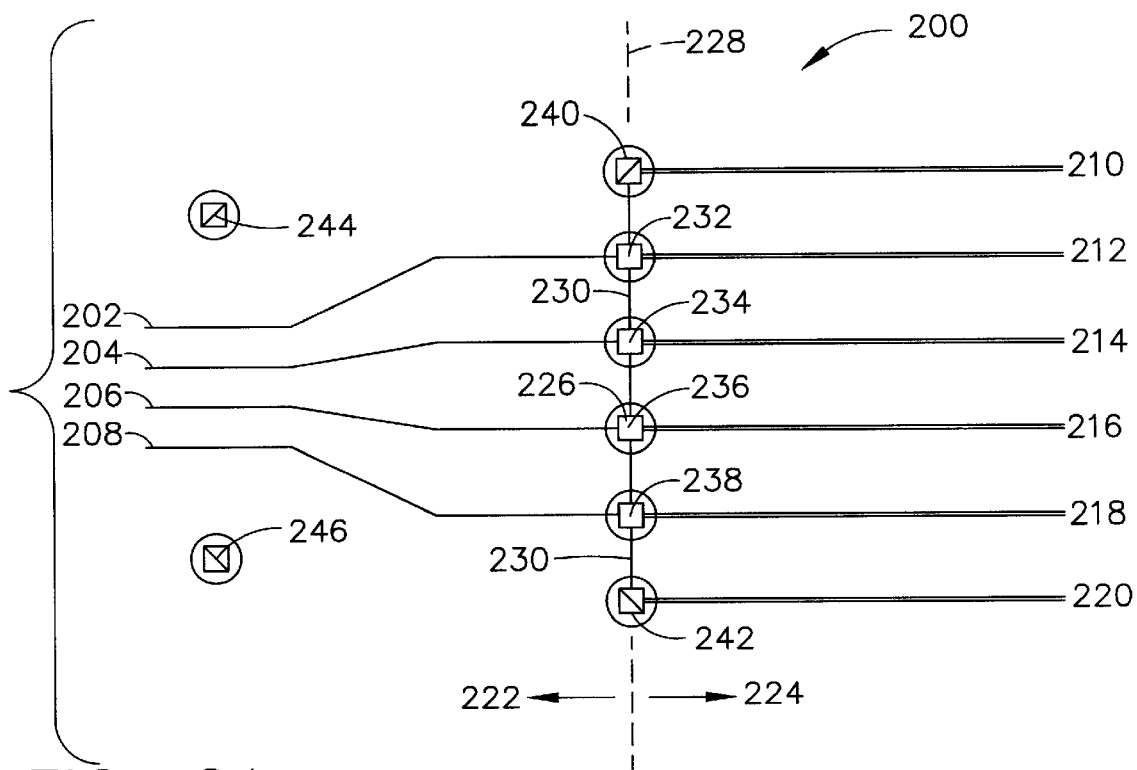
FIG. 2A is a schematic of typical optical cables showing a normal configuration of the reconfigurable optical splice.
Figure 2B:
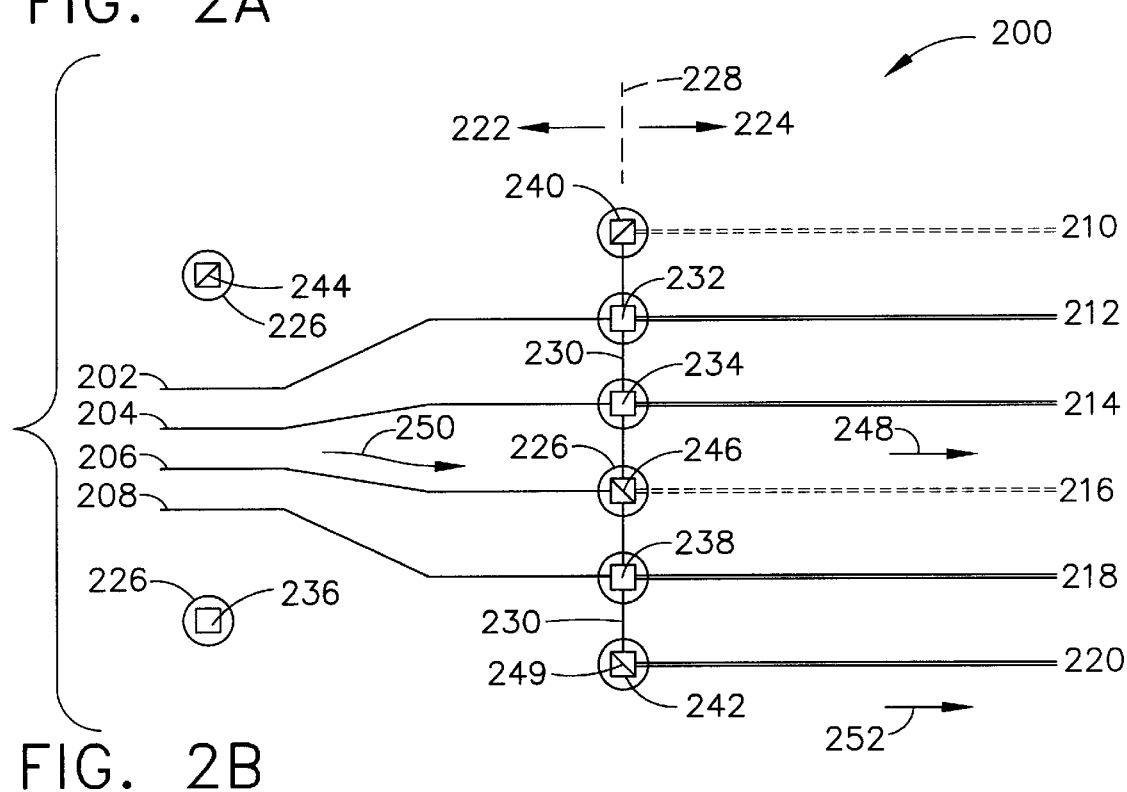
FIG. 2B is a schematic of typical optical cables showing a reconfigured optical splice.

Referring to FIGS. 2A and 2B, a schematic of typical optical cables including reconfigurable splice 200 is shown, which may be based on silicon optical bench technology. Optical fibers including input optical fibers 202, 204, 206, and 208, as well as output optical fibers 210, 212, 214, 216, 218, and 220 comprise the cables to be spliced. These optical fibers may lie in grooves etched in a silicon substrate using known photolithographic techniques. It should be noted that only a connection of a four fiber to a six fiber cable is depicted in FIGS. 2A and 2B for the sake of simplification. In practice, any number of fibers may be used. However, one exception is that the count of the output fibers must be greater than input fibers by at least one count. Four grooves may be etched on the top of the silicon base (not shown) from input side 222 of the splice 200, and six grooves may be etched in from output side 224. The four grooves on input side 222 eventually line up with the middle four of the six grooves on output side 224. A cover (not shown) above the silicon base keeps the fibers 202, 204, 208, and 210, as well as 210, 212, 214, 216, 218 and 220 in the grooves. In the middle of the splice 200, or at an imaginary line 228 dividing the six output grooves and the four input groves, six substantially square pits (not shown) may be etched in the silicon substrate. The pits may be inter-connected by an optical path 230 running at 90° to the grooves for the cable fibers 202, 204, 208, and 210, as well as 210, 212, 214, 216, 218 and 220. The optical path 230 may interconnect all six substantially square pits. Due to fabrication limitations, square pits etched on the silicon substrate may not be a perfect square, but should be substantially square using known technology.

The six pits may be disposed to receive passive optical elements or components such as glass cubes. Four of the pits may contain simple or straight through glass cubes 232, 234, 236, and 238 of glass of a refractive index close to that of the cores of the optical fibers used in the optic cables, thereby facilitating an efficient optical signal transfer with minimum attenuation. These glass cubes will allow straight-through passage of light from one vertical face to the directly opposite vertical face. Two of the pits contain glass cubes 240 and 242 and may be made of two glass prisms glued together with a metallized reflective surface between them, whereby incoming optical signal can be reflected. In other words, cubes 240 and 242 may cause light entering on one vertical face to reflect at the metallized surface and make a 90° turn, thereby causing the light to exit at an adjacent vertical face. Two isolated pits, each containing a 90° turn cube 244 and 246 may also be provided in the splice 200, or in close proximity to the splice 200, for use in the reconfiguration process.

In normal operations, as shown in FIG. 2A, signals on the four input fibers 202, 204, 206, and 208 may go straight through the splice 200 to the middle four of the six output fibers 212, 214, 216 and 218. As can be appreciated, this may be accomplished by aligning the four "straight through" cubes 232, 234, 236, and 238 in the pits with the four input fibers 202, 204, 208, and 210 and the center or middle four output fibers 212, 214, 216 and 218 or optic signal transmission. The two pits at the ends of optical path 230 may be coupled to two output fibers 210 and 220 respectively. The two output fibers 210 and 220 are the spare fibers, each containing a 90° turn cube 240 and 242 which are not used for signal transmission during normal operations.

Referring to FIG. 2B, in the event that it is necessary to reroute an input signal to one of the spare output fibers 210, 220, the maintenance or repair person may accomplish the rerouting by removing a "straight through" cube, such as cube 236, from an original path 248 of optic signal disposed to be rerouted, and inserting a "90° turn cube" such as cube 244 or cube 246 in its place. When properly inserted, the result of inserting the turn cube may be to direct an incoming optic signal through a segment of the optical path 230 to one of the spare output fibers, in this case, fiber 220. The incoming optic signal may cross any segment of the input/output optical fiber path 230 and proceed to the 90° turn cube at a start of one of the spare fibers such as point 249 of fiber 220. The 90° turn cube at the start of the spare fiber may turn the light into the path of the spare fiber, e.g. fiber 220, thus accomplishing the reconfiguration. Specifically, in FIG. 2B, the splice 200 is reconfigured to redirect light from incoming path 250 along incoming fiber 206 on the incoming side 222 to an outgoing path 252 along output fiber 220. Inactive paths or portions are shown by dotted or broken lines. In this case, output fibers 210 and 216 may be inactive. Since light beams do not interfere with each other the way electric currents do, it is possible to pass the light being sent to the spare path through the light on adjacent paths without difficulty. Therefore all the optic paths can be in the same plane, which simplifies fabrication of the device. It is not necessary to carry signals over or under each other to cross one signal to the other side of another.

Various enhancement of the instant invention may be achieved by the addition of specific details of splice 200. They are described below.

All necessary parts for reconfiguration may be contained within splice 200. The parts include the two isolated pits, each containing a 90° turn cube 244 and 246. The 90° turn cubes 244 and 246 needed for reconfiguration may be stored in the isolated pits mentioned above. As can be appreciated, during reconfiguration, the straight through cube 236 to be removed from the optic path and the 90° turn cube 246 in one of the isolated pits may be interchanged. The proximity of parts helps to simplify the reconfiguration since the necessary parts are located close at hand.

Another enhancement is that in order to make the glass cubes 232–238 and 240–246 easy to handle, they may be attached to covers 226, (drawn as ovals in FIGS. 2A and 2B), one for each cube, that can be removed easily by hand or some simple tool. One possible way to do that may be to have the covers 226 made of ferromagnetic or paramagnetic material so that the cubes 232–238 and 240–246 may be extracted with a simple magnetized screwdriver. The splice cover (not shown) that holds the fibers 202–220 in place may remain in place or stationary during the reconfiguration process so that fibers contained therein are kept in proper alignment. This may be done easily using known manufacturing methods and devices. Some other mechanism or parts such as a separate outer cover may be over the entire array of cubes 232–238 and 240–246 and their covers 226, which may be oval shaped, to hold the cubes in place during normal use.

A third enhancement is that cubes 232–238 and 240–246 may need to have vertical faces to match properly to the vertical end faces of the optical fibers 202–220. However, the pits etched in the silicon substrate to hold the cubes 202–220 may not need to be exactly square with exactly vertical sides. There need only be three points in the proper locations to hold the cubes in the proper orientation. This may be provided by the fiber end faces of fibers 202–220 that are in proximity to the cubes 232–238 and 240–246. The orientation of the end faces may work with the shape of the cube lids 226 to keep the cubes properly oriented. In other words, the lids 226, may be affixed upon the cubes 232–238 and 240–246. This may be easily accomplished using known methods and mechanisms for alignment, a significant feature, because silicon's crystal structure allows only certain etch angles, and the crystal orientation that is optimal for etching the fiber grooves may not be optimal for etching truly vertical sides on the pits. Therefore, due to the above, the goal may be to substantially align fiber end faces with their respective cubes such that a minimum loss of optic signal information is achieved when possible.

A fourth enhancement may be that to reduce optical losses and signal crosstalk, it may prove desirable to use an optical index matching fluid in the pits to assure that there is no airspace between the fiber end faces and the vertical surfaces of the cubes 232–238 and 240–246. The use of matching index fluid may further enhance the function of splice 200 by helping to hold cubes 232–238 and 240–246 in place when the outermost cover (not shown) is off. Furthermore, it may help to reduce or dampen vibrations if they exist. However, other known means for keeping the cubes stationary may be used instead of the optical index match fluid. Furthermore, other techniques, such as optical anti-reflection filters can reduce the optical effects of glass-to-air interfaces at the surfaces of the cubes 232–238 and 240–246 without the use of index matching fluids.

A fifth enhancement may be that the reconfigurable splice 200 may also contain the provisions for mating cables with fibers of different diameters and different fiber spacings relative to each other using known methods. The different sized grooves necessary to connect fibers of different sizes have already been demonstrated in silicon optical benches. Furthermore, the angled groove sides necessary to accomplish spreading of the fiber grooves, which will spread the fibers to a different spacing, is also known. It is evident that by combining the above known features, the fifth enhancement further enhances the instant invention.

One further feature of the instant invention may be that it accommodates the inherent layout or dimensions of commercial products or devices. For example, the side of a device, such as first device 114 or second device 120, facing a transmitter or receiver may have as equal number of optical channels as the transmitter or receiver facing the device. But there may be times when the number is not equal. Therefore, by using splice 200, the unused channel may be utilized.

A further feature of the instant invention may be that all of the technological processes necessary to make the reconfigurable splice are available commercially. Silicon "V" groove optical splices that align fibers of different cables and direct fibers around gentle bends have been made. The technology to form holes through a glass cover on the silicon "V" groove structure is known, and the method that makes the holes can make them noncircular to aid in aligning the cubes. Optic cubes and prisms of the size needed to match the optical fibers are available commercially as well. What is not known or has not been prototyped is integrating all the above features into one device.

It is evident that the instant invention features a reduction in maintenance. Another feature is the reduction in repair and support costs. It reduces the tools needed for optic link repair from a suitcase of specialized tools, to hand tools that could be carried in a maintenance or repair person's pocket, or bare hands may suffice. Therefore, if suitably designed, no tool may be needed at all. The fingers on a repairman's hand may be the only thing needed for the reconfiguration. Because the simple reconfiguration made possible by the invention, it is also possible for operations to continue even with cable failures, without the need for operational delays to replace or repair cables.

This invention may reduce the rework that would be necessary in the event that an optical cable is damaged during installation at the factory by confining the most likely causes of damage to the accessible, removable ends of a cable harness and reducing the risk of damage to the mid section of the harness, which will be deeply buried in the system of a vehicle. Furthermore, this invention may reduce the rework that would be necessary in the event that one transmitter or receiver channel in an array device fails during the manufacturing process.

It is noted that the application of the instant invention is not limited to aviation vehicles such as airplanes. It may be applied to automobiles or space vehicles under suitable conditions. The features of the instant invention may be applied to reduce the time and therefore the cost of repairs to optic links by allowing repair shops to easily shift a signal traversing a cable in a hard-to-reach location from a failed fiber or cable to a redundant fiber or cable. In other words, by leaving at least one redundant fiber at hard to reach places of a system, they may be later used for replacement of a failed fiber. In addition, telecommunications industry in general can use the instant invention as well, especially for systems with sufficient dimension where certain portion of the system may be hard to reach.

It is further noted that the fiber used in the instant invention may comprise optic fibers or various refractive indexes and materials. They include stepped index fiber, graded index fiber, single-mode fiber, graded index multi-mode fiber, or may be a combination of others.

It is evident that in some applications of the instant fiber optic system, all the channels or fiber links will be used, while in others, less channels will be used. The same devices may be used in all locations, thereby minimizing cost of assembly by the use of inexpensive commercial parts. This approach will also minimize maintenance and support cost, because only one type of part need be stocked and supported. However, it also means that many devices will be carrying transmitter/receiver channels or fiber links, which have no use or remain idle. This invention provides a way for a failed device, that carries unused or idle channels, to be quickly repaired by reconfiguring the device to make use of one of the previously unused channels.

It should be understood, of course, that the foregoing relates to preferred embodiments of the invention and that modifications may be made without departing from the spirit and scope of the invention as set forth in the following claims.

We claim:

1. A reconfigurable optical cable splice, comprising:
   at least one input line;
   a plurality of output lines;
   a plurality of connecting elements of substantially cubic shape, the connecting elements including at least one ninety degree turning cube and a plurality of straight through cubes;
   each of the connecting elements has a first surface disposed to be coupled to an end of the at least one input line and having at least two second surfaces disposed to be respectively coupled to at least two output lines, whereby each input line defines an optic path for optic signals using one of the plurality of output lines; and
   at least one storage location for storing at least one connecting element not in use.

2. The reconfigurable optical cable splice of claim 1, further comprising at least one light path for light to pass from the at least one input line to one of the plurality of connecting elements and to one of the plurality of output lines.

3. The reconfigurable optical cable splice of claim 1, wherein the output lines are spaced apart in relation to the input lines.

4. The reconfigurable optical cable splice of claim 1, wherein the plurality of connecting elements are made of optic glass.

5. An optic cable system, comprising:
   a first device;
   a second device; and
   a coupling subsystem coupling the first device and the second device, the subsystem including:

a reconfigurable splice having a first end disposed to accommodate a first number of optic fibers coupled to the first device and a second end disposed to accommodate a second number of optic fibers coupled to the second device, wherein the first number has a lesser value than the second number;

a plurality of input lines equal in number with the first number of optic fibers;

a plurality of output lines equal in number with the second number of optic fibers;

a plurality of connecting elements of substantially cubic shape, the connecting elements having at least one ninety degree turning cube and a plurality of straight through cubes, each of the connecting elements having a first surface disposed to be coupled to an end of the plurality of input lines and further having at least two second surfaces disposed to be coupled to at least two output lines, whereby each input line defines an optic path for optic signals using one of the plurality of output lines; and at least one storage location for storing at least one connecting element not in use.

6. The system of claim 5, further comprising spare fibers interposed between the reconfigurable splice and the second device.

7. The system of claim 5, wherein the reconfigurable splice further comprises discrete optic fibers connected to the second device and disposed to be manually attached to or detached from the second device.

8. The system of claim 5, wherein the reconfigurable splice further comprises at least one light path for light to pass from one of the plurality of input lines to one of the plurality of connecting elements and to one of the plurality of output lines.

9. The system of claim 5, wherein the output lines are spaced apart in relation to input lines.

10. The system of claim 5, wherein the plurality of connecting elements are made of optic glass or optic polymer.

11. An aircraft optic cable system, comprising:

an initial segment accessible for maintenance, including:
 a first device; and
 a reconfigurable optical splice coupled to the first and second devices, the optical splice having:
  a first end disposed to accommodate a first number of optic fibers originating from the first device and coupled to the first device;
  a second end disposed to accommodate a second number of optic fibers, wherein the first number has a lesser numerical value than the second number;
  a plurality of input lines equal in number with the first number of optic fibers;
  a plurality of output lines equal in number with the second number of optic fibers;
  a plurality of connecting elements of substantially cubic shape, including at least one ninety degree turning cube and a plurality of straight through cubes;
  each of the connecting element has a first surface disposed to be coupled to an end of the plurality of input lines and at least two second surfaces disposed to be coupled to at least two output lines, respectively, whereby each input line defines an optic path for optic signals using one of the plurality of output lines; and
  at least one storage location for storing at least one connecting element not in use;

an intermediate segment unaccessible for maintenance, including:
 ribbon cables having a first end coupled to the plurality of output lines and spaced apart from the plurality of input lines;
 a first portion of a set of discrete cables coupled to a second end of the ribbon cables disposed to fan-out to various locations; and a final segment accessible for maintenance, including:
 a second device and a second portion of the set of discrete cables interposed between the second device and the ribbon cables.

12. The system of claim 11, wherein the output lines of the reconfigurable optical splice with are spaced apart in relation to the input lines.

13. The system of claim 11, wherein the plurality of connecting elements are made of optic glass or optic polymer.

14. A method for configuring an optical cable splice, comprising the steps of:

determining whether configuring is needed;

opening a cover of the optical cable splice; and rearranging elements within the optical cable splice which comprises exchange a first cube with a second cube, whereby an incoming signal coming from an incoming cable is redirected from a first output cable to a second output cable.

15. The method of claim 14, wherein the second cube comprises a ninety degree turn cube.

16. The method of claim 14, wherein the determining step comprises signaling out a particular optical fiber for configuring.

* * * * *